Patented Apr. 23, 1940

2,197,798

UNITED STATES PATENT OFFICE 2,197,798

METHOD OF PRODUCING ESTERS

Henry B. Gans, Jr., Uniontown, Pa., and Arthur B. Holton, Olmsted Falls, Ohio

No Drawing. Application September 4, 1935, Serial No. 39,186

15 Claims. (Cl. 260—476)

This invention relates to the manufacture of esters of the type $$R-O-\overset{\overset{O}{\|}}{C}-R'$$

where R represents an aralkyl radical and R' represents a hydrogen radical preferably derived from formic acid or formyl chloride, or an alkyl, aryl or aralkyl radical of a type capable of being part of an acyl radical, $$\underset{|}{R'-C=O}$$

in which the open bond may have been either a halogen and thus derived from an acyl halide as $$\underset{X}{\overset{R'-C=O}{|}}$$

wherein X represents a halide, or a hydroxyl group and thus derived from an acid, $$\underset{OH}{\overset{R'-C=O}{|}}$$

or in general R' may be any type of radical capable of forming an organic acid or acyl halide.

More specifically, the invention is particularly applicable to the production of esters of the type set forth wherein the aralkyl compound representing R is a benzene ring or a plurality of benzene rings carrying a hydrocarbon radical. As an example, the aralkyl radical may be a phenyl methyl or benzyl radical, such as $C_6H_5CH_2$—, the structural formula of which is:

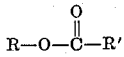

or a similar phenyl radical containing a chain of $CH_2$ groups. In other words, the aralkyl radical may contain a single hydrocarbon radical comprised of one or more carbon atoms in a chain, and the aralkyl radical will then become $C_6H_5(CH_2)_n$—, where $n$ represents a variable number of $CH_2$ groups. Furthermore, the aralkyl radical may contain a plurality of hydrocarbon carbon radicals as typified by the p-methyl phenyl alkyl radical $CH_3$—$C_6H_4(CH_2)_n$—.

As an example of R representing a plurality of benzene rings, the radical alpha or beta naphthyl may be set forth, the hydrocarbon radical, of course, in this compound being in the alpha or beta position.

A specific example of such radical is alpha, naphthyl ethyl, the structural formula being:

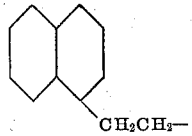

A further example is the alpha naphthyl isobutyl radical, the structural formula being:

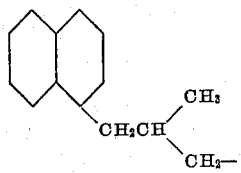

R may also represent an anthracene radical and as a specific illustrative example thereof the compound 1-anthracyl ethyl- is set forth.

Examples of the alkyl radicals which R' may represent are:

| | |
|---|---|
| $CH_3$— | methyl radical |
| $CH_3CH_2CH_2$— | propyl radical |
| $\underset{CH_3}{\overset{CH_3}{\diagdown}}CH-CH_2-$ | isobutyl radical |
| $CH_3(CH_2)_7CH_2$— | nonyl radical |

Examples of the aryl radical which R' may represent are:

| | |
|---|---|
| $C_6H_5$— | phenyl |
| $C_{10}H_7$— | naphthyl |
| $C_{14}H_9$— | anthracyl |

Examples of aralkyl radicals which R' may represent are:

| | |
|---|---|
| $C_6H_5CH_2$— | phenyl methyl |
| $\underset{\overset{|}{CH_2CH_2-}}{C_6H_4-CH_3}$ | ortho tolyl ethyl |

Similar aralkyl radicals may be used containing the naphthyl and the anthracyl radicals.

R' may represent the hydrogen radical (H—).

In accordance with the present invention, the compound $R_2O$, in which R is as above set forth, is treated with any compound capable of forming the radical $$\underset{|}{R'-C=O}$$

provided the open bond of the above radical may have been tied to a halogen and thus derived from an acyl halide

wherein X represents a halide, or to a hydroxyl group and thus derived from an acid

and therefore the preferred agent for treating the compound $R_2O$ is one of the reactant group of an organic acid and an acyl halide, said reactant constituent having present the hereindescribed R' constituent.

The ether represented as $R_2O$, as above set forth, may be considered either as a mixed ether or as a simple ether without affecting the reactions involved.

The relationship between the different groups above set forth may be graphically brought out by the following structural formulae:

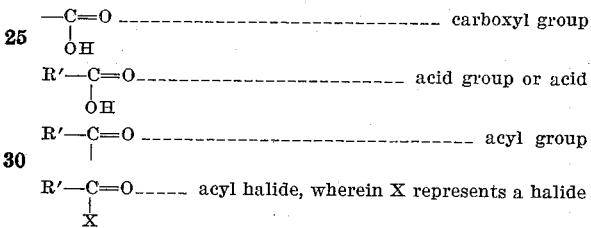

The reaction is carried out in the presence of a catalyst to produce an ester of the type

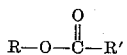

When one of the reactants is an organic acid, such as acetic acid, the catalyst is a strong mineral acid preferably sulfuric acid. Phosphoric acid may also be used. Various concentrations of sulfuric acid may be used, although it works best when the concentration is between 50 and 90%. 70% sulfuric acid which is 55° Bé. is the preferred strength of sulfuric acid. When the reactant is an acyl halide containing the acyl constituent

the reaction is carried out in the presence of a metal halide functioning as a catalyst.

While the acyl halides in general may be used and the most satisfactory results have been obtained by using acetyl and benzoyl chloride, good results may be obtained by using the acyl bromides, such as acetyl bromide, butyryl bromide and the like. Acyl halides, such as propionyl chloride and phenyl acetyl chloride $$C_6H_5CH_2COCl$$

may also be used.

The present invention is especially applicable to the production of phenyl substituted aliphatic esters. It is particularly difficult to convert the phenyl substituted aliphatic ethers into the corresponding esters and obtain a good yield and a fairly pure product. However, in accordance with the present invention, it is possible to obtain good yields and fairly pure products.

It may be stated that an attempt was made to treat the phenyl aliphatic ethers with various mineral acids, organic acids, and organic acid anhydrides. Sulfuric acid and acetic anhydride were heated in the presence of the phenyl aliphatic ethers over long periods of time with little or no result. The same mixture was heated to high pressures in bomb apparatus with either no result or excessive charring of the reactants. The same mixture was heated in a bomb with catalysts which represents a high pressure reaction and also at atmospheric pressure in the presence of various catalysts such as silver sulphate, lithium salts, copper salts, and also finely divided metallic copper. This procedure failed to give good results. As a general rule, the reaction did not show signs of going in the direction desired, as generally a sulphonation of the benzene ring occurs or various addition products result instead of splitting of the ether as is desired.

The presence of the aryl group in a phenyl substituted aliphatic ether gives rise to the possibility of numerous side reactions on the aromatic group, due to the activity of the esterizing agents and the activity of the catalyst.

The experiments carried out indicated that there was a real problem involved in producing phenyl aliphatic esters from the phenyl ethers of the character above set forth. It was finally discovered that good yields and fairly pure products were obtained by treating ethers of the type above set forth with a treating agent containing the potential acyl group

such as an organic acid or an acyl halide in the presence of a suitable catalyst. When the organic acid is used, the best catalyst is sulfuric acid. It may be pointed out when using the organic acid with a sulfuric acid catalyst, little sulphonation was obtained, and this is in contradistinction to the method above set forth, wherein the phenyl aliphatic ethers of the type mentioned were treated with a mineral acid such as sulfuric acid. When the phenyl aliphatic ethers are treated with the acyl halide, it was found that an anhydrous metal halide functioned most satisfactorily as a catalyst. When using the acyl halides with phenyl aliphatic ethers a phenyl aliphatic halide will be produced as a by-product, as for example:

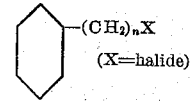

The preparation of ethers and halogenated derivatives from esters may be easily carried out by the action of an acyl halide in the presence of a catalyst, such as anhydrous zinc chloride. For example, beta beta' diphenylethyl ether is treated with acetyl chloride in the presence of anhydrous zinc chloride, the reactants being present in the following proportions by weight:

| | Per cent |
|---|---|
| Beta beta' diphenylethyl ether | 54 |
| Acetyl chloride | 28 |
| Zinc chloride | 18 | and the reaction being:

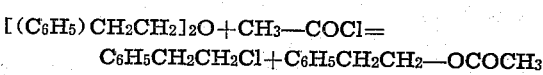

After heating gently for ninety minutes, the reaction mixture is washed with water and the oily layer diluted with ether and separated from the water layer. The water layer is then extracted with ether, the ether layer separated, and the latter is then combined with the first oily layer. On fractional distillation, there was obtained good yields of phenyl ethyl chloride boiling at 88° C. at about 16 mm. pressure and phenyl ethyl acetate boiling at about 109° C. at about 15 mm. pressure.

Another method for the preparation of esters may be used. This involves the use of strong sulfuric acid and organic acids. For example, beta beta' diphenylethyl ether, 33 parts by weight, is mixed with 33 parts of acetic acid in the presence of 34 parts of 70% $H_2SO_4$. This mixture is refluxed for about 36 hours at substantially atmospheric pressure, the boiling temperature being about 130° C.

The mixture is then allowed to settle and cool, forming 2 layers. The oily layer is separated, then washed with a saturated $NaHCO_3$ solution until no more acid is present, then washed again with water and thereafter dried over calcium chloride. On distillation, a fair amount of phenyl ethyl acetate was recovered boiling at about 119° C. at 16 mm. pressure.

A further example is as follows:

47 parts by weight of beta beta' diphenylethyl ether treated with 43 parts of benzoyl chloride in the presence of 10 parts of anhydrous zinc chloride, the reaction being:

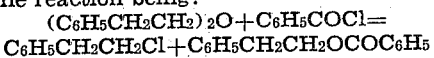
$C_6H_5CH_2CH_2Cl + C_6H_5CH_2CH_2OCOC_6H_5$

The reaction mixture is treated in a water bath to about 60—65° C. and is then allowed to react exothermically up to 85° to 90° C. The mixture shall be cooled if necessary. It is then heated for four (4) to six (6) hours at about 85° C. The reactance mixture is then washed with cold water to remove the zinc chloride and then with hot water to decompose any unreacted benzoyl chloride present to benzoic acid. It is important that the reaction mixture be treated with hot water, preferably boiling, since benzoyl chloride is not properly decomposed unless the water is hot. The benzoic acid is then removed from the oily layer by washing with an alkaline solution. Many compounds well known in the art may be used, as a washing medium, but it is preferred to use sodium acid carbonate, $NaHCO_3$ and more satisfactory results are obtained when the sodium acid carbonate solution is saturated. The resulting oily mixture is then fractionally distilled to yield phenyl ethyl chloride boiling at 90° C. at about 16½ mm. and phenyl ethyl benzoate boiling at 186° C. at about 16 mm. The yield in each case was about 65%.

While 65% may not seem a very great yield, it is considered to be a satisfactory yield compared with what could be obtained by any other of the processes which were experimented with.

In the method wherein the phenyl aliphatic ethers are treated with an acyl halide in the presence of an anhydrous metallic chloride, it may be stated that various anhydrous chlorides may be used. However, certain metal chlorides will produce good yields, and certain metal chlorides will produce much lower yields.

While the amount of metal halide catalyst used may obviously greatly vary, it is desired that the catalyst be present in a percentage varying between 1% to 20%, based on the weight of the reaction mixture.

While it is within the broad province of the present invention to use any metal halide as a catalyst which will tend to reduce the charring and gumming of the reaction product and will thereby produce satisfactory high yields, the most desirable catalyst from this point is anhydrous zinc chloride. Of course, anhydrous zinc chloride does give some charring and gumming, depending upon the manipulation of this phase of the reaction, but with proper control, anhydrous zinc chloride seems to work just a little better than the other catalysts, from the standpoint of charring and gumming. It is to be noted that the yield also depends on holding the temperature of the reaction rather low and preferably around 85° to 90° C. to thereby prevent side reactions. However, if the temperature is held too low, then the yield will be low because of insufficient reaction of the reacting materials. On the other hand, if the temperature is too high, there will be excessive charring and gumming, and so again the yield will be reduced. In every case, depending upon the character of the reacting materials, it is necessary to balance these factors one against the other, and work out that temperature which gives a maximum yield with little charring and/or gumming. In other words, for each acyl halide or chloride employed, there is a separate temperature range which gives the best results. It is a very important point of the present invention that the temperature in the present process must be controlled so as to give a maximum yield of the final product with little gumming or charring. The basic principles governing the above have been set forth, and it will be obvious in view of the examples disclosed to work out the proper reacting temperature when employing various reacting agents. It is recognized that other metal halides may be used as catalysts for example, the iron chlorides may be used but the yield will be low.

Instead of using the metal chlorides, metal iodides or bromides may be used, but they are not as effective as the chlorides. Zinc bromide is the substantial equivalent of the zinc chloride. Zinc iodide may be a little too active and consequently reduce the yield, while zinc fluoride would not be active enough.

In the formation of esters from organic acids and the ethers mentioned in the presence of a suitable catalyst or catalysts, organic acids other than acetic may be used. For example, propionic acid may be substituted for acetic acid in suitable proportion and lead to the formation of the corresponding propionate.

The present application is a continuation-in-part of application Serial No. 624,146, filed July 22, 1932, now Patent No. 2,013,752, September 10, 1935.

What is claimed is:

1. The method of producing esters of the type

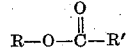

where R represents an aralkyl radical, and R' represents one of the group consisting of a hydrogen radical, an alkyl, aryl and aralkyl radical capable of forming a compound of the group consisting of an organic carboxylic acid and an acyl halide comprising treating the ether $R_2O$, in which R is as above set forth, with one of the reactant group consisting of an organic carboxylic acid and an acyl halide, said reactant compound having present the above described R' constituent, the reaction being carried out in the presence of a catalyst facilitating said reaction, said catalyst being an anhydrous metal halide when the reactant group is an acyl halide, and being selected from the group consisting of sulfuric and phosphoric acid when the reactant group is an organic carboxylic acid.

2. The method of producing esters of the type

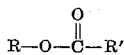

where R represents an aralkyl radical, and R' represents one of the group consisting of a hydrogen radical, an alkyl, aryl and aralkyl radical capable of forming an acyl halide comprising treating the ether $R_2O$, in which R is as above set forth, with an acyl halide, said reactant compound having present the above described R' constituent, the reaction being carried out in the presence of an anhydrous metal halide catalyst inhibiting the charring and gumming of the reaction product.

3. The method of producing esters of the type

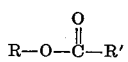

where R represents an aralkyl radical, and R' represents one of the group consisting of a hydrogen radical, an alkyl, aryl and aralkyl radical capable of forming a compound of the group consisting of an organic carboxylic acid and an acyl halide comprising treating the ether $R_2O$, in which R is as above set forth with one of the reactant group consisting of an aliphatic organic carboxylic acid and an aliphatic acyl halide, said reactant compound having present the above described R' constituent, the reaction being carried out in the presence of a catalyst facilitating said reaction, said catalyst being an anhydrous metal halide when the reactant group is an aliphatic acyl halide, and being selected from the group consisting of sulfuric and phosphoric acid when the reactant group is an organic carboxylic acid.

4. The method of producing esters of the type

where R represents an aralkyl radical, and R' represents one of the group consisting of a hydrogen radical, an alkyl, aryl and aralkyl radical capable of forming a compound of the group consisting of an organic carboxylic acid and an acyl halide comprising treating the ether $R_2O$, in which R is as above set forth with one of the reactant group consisting of an aromatic organic carboxylic acid and an aromatic acyl halide, said reactant compound having present the above described R' constituent, the reaction being carried out in the presence of a catalyst facilitating said reaction, said catalyst being an anhydrous metal halide, when the group is an aromatic acyl halide, and being selected from the group consisting of sulfuric and phosphoric acid when the reactant group is an organic carboxylic acid.

5. The method of producing esters of the type

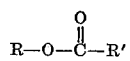

where R represents an aralkyl radical, and R' represents one of the group consisting of a hydrogen radical, an alkyl, aryl and aralkyl radical capable of forming an acyl halide comprising treating the ether $R_2O$, in which the R is as above set forth, with an acyl halide, said reactant compound having present the above described R' constituent, the reaction being carried out in the presence of an anhydrous zinc halide catalyst.

6. The method of producing esters of the type

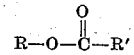

where R represents an aralkyl radical, and R' represents one of the group consisting of a hydrogen radical, an alkyl, aryl and aralkyl radical capable of forming an acyl chloride comprising treating the ether $R_2O$, in which the R is as above set forth, with an acyl chloride, said reactant compound having present the above described R' constituent, the reaction being carried out in the presence of an anhydrous zinc chloride catalyst.

7. The method of producing esters of the type

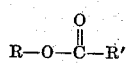

where R represents an aralkyl radical, and R' represents one of the group consisting of a hydrogen radical, an alkyl, aryl and aralkyl radical capable of forming an acyl chloride comprising treating the ether $R_2O$, in which R is as above set forth, with an acyl chloride, said reactant compound having present the above described R' constituent, the reaction being carried out in the presence of an anhydrous metal chloride catalyst inhibiting the charring and gumming of the reaction product.

8. The method of producing esters of the type

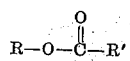

where R represents an aralkyl radical, and R' represents one of the group consisting of a hydrogen radical, an alkyl, aryl and aralkyl radical capable of forming an acyl halide comprising treating the ether $R_2O$, in which R is as above set forth, with an acyl halide, said reactant compound having present the above described R' constituent, the reaction being carried out in the presence of an anhydrous metal halide catalyst inhibiting the charring and gumming of the reaction product.

9. The method of producing esters of the type

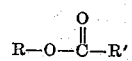

where R represents at least one benzene ring carrying an aliphatic radical, and R' represents one of the group consisting of a hydrogen radical, an alkyl, aryl and aralkyl radical capable of forming an acyl halide comprising treating the ether $R_2O$ in which R is as above set forth, with an acyl halide, said reactant compound having present the above described R' constituent, the reaction being carried out in the presence of an anhydrous zinc chloride.

10. The method of producing phenyl alkyl esters comprising reacting a bis-phenyl alkyl ether with benzoyl halide in the presence of anhydrous zinc halide, treating said mixture to remove the zinc halide, washing the resulting product with hot water to decompose any unreacted benzoyl halide, removing the decomposition product by washing with an alkaline solution and fractionally distilling to produce phenyl alkyl halide and a phenyl alkyl ester.

11. The method of producing phenyl alkyl esters comprising reacting a bis-phenyl alkyl ether with benzoyl halide in the presence of anhydrous zinc halide, treating said mixture to remove the zinc halide, washing the resulting product with hot water to decompose any unreacted benzoyl halide, removing the decomposition product by washing with a sodium bicarbonate solution and fractionally distilling to produce a phenyl alkyl halide and a phenyl alkyl ester.

12. The method comprising treating beta beta' diphenylethyl ether with acetic acid in the presence of sulfuric acid, the latter acting as a catalyst, heating the mixture and recovering therefrom a phenyl ethyl acetate.

13. The method comprising treating a bisphenyl alkyl ether with an organic carboxylic acid in the presence of sulfuric acid, the latter acting as a catalyst, heating the mixture and recovering therefrom a phenyl alkyl ester.

14. The method comprising treating a bisphenyl alkyl ether with an acyl halide in the presence of an anhydrous metal halide catalyst inhibiting charring and gumming while holding the temperature of the reaction below that point at which side actions occur.

15. The method comprising treating a bisphenyl alkyl ether with an acyl halide in the presence of an anhydrous metal halide catalyst inhibiting charring and gumming while holding the temperature of the reaction below approximately 90° C.

HENRY B. GANS, Jr.
ARTHUR B. HOLTON.